Figure 1:
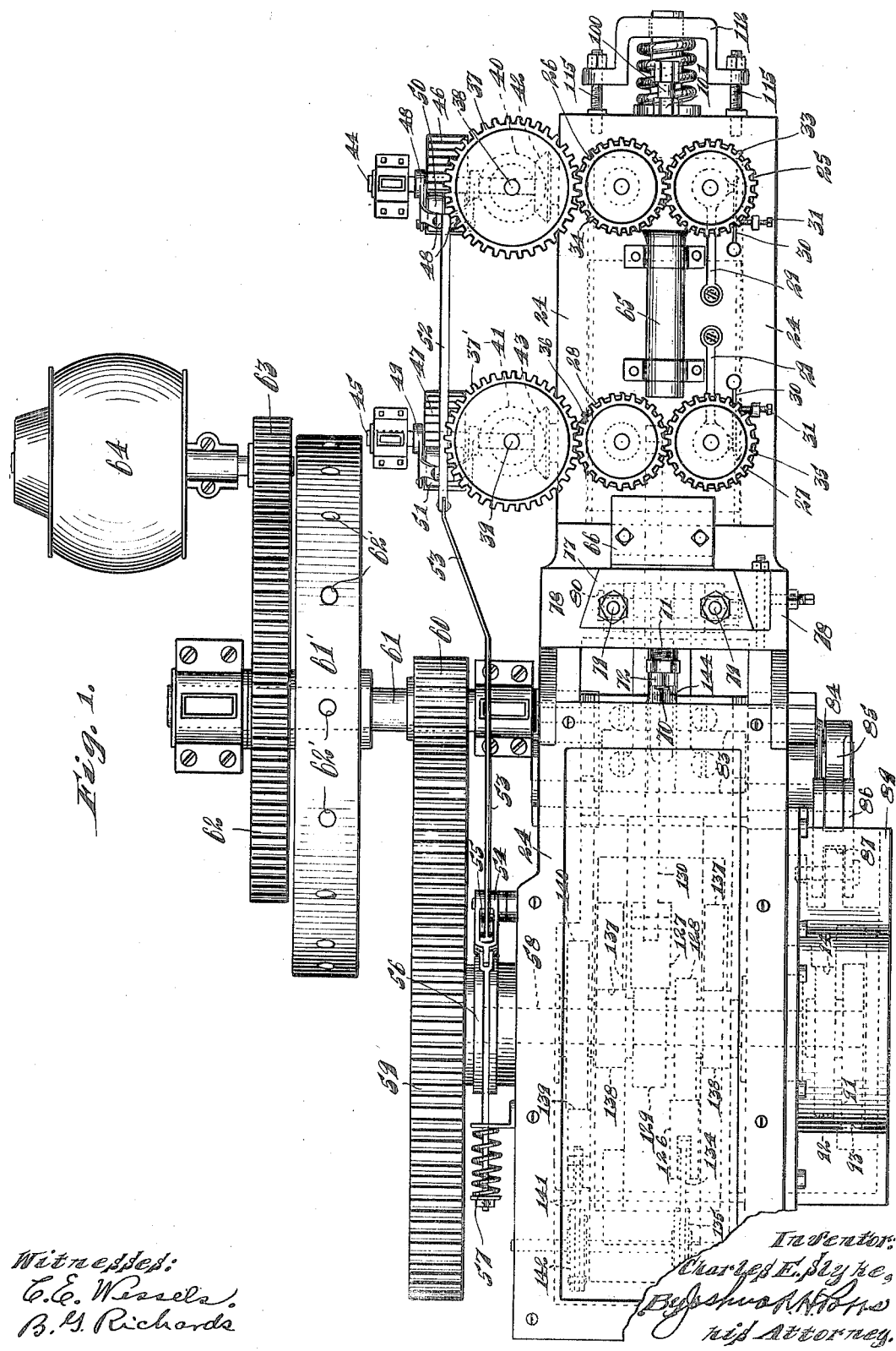

C. E. SLYKE.
NUT MAKING MACHINE.
APPLICATION FILED JUNE 19, 1916.

1,283,933.

Patented Nov. 5, 1918.

8 SHEETS—SHEET 1.

Witnesses:
C. E. Wessels
B. G. Richards

Inventor:
Charles E. Slyke,
By Oswald Hopps
his Attorney.

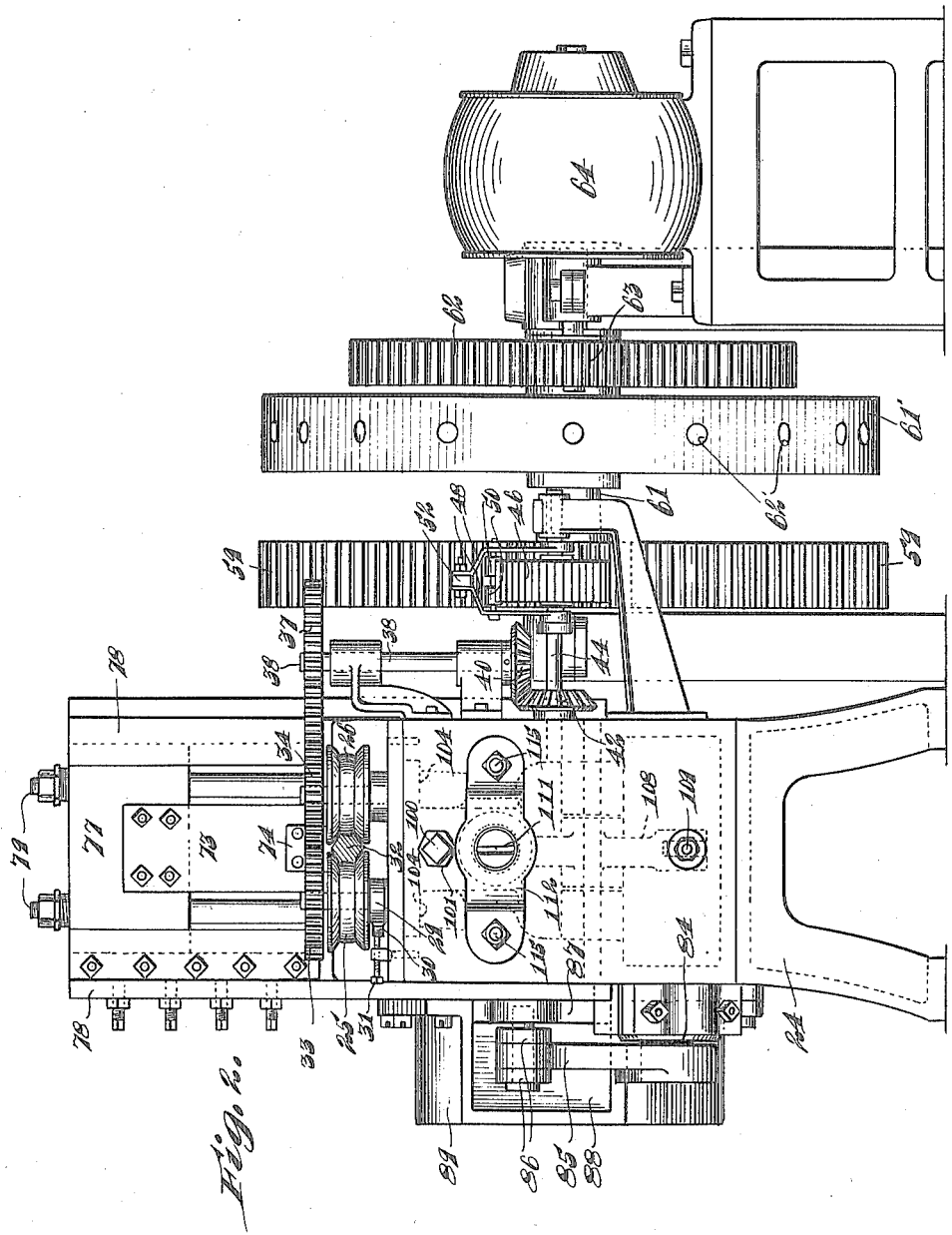

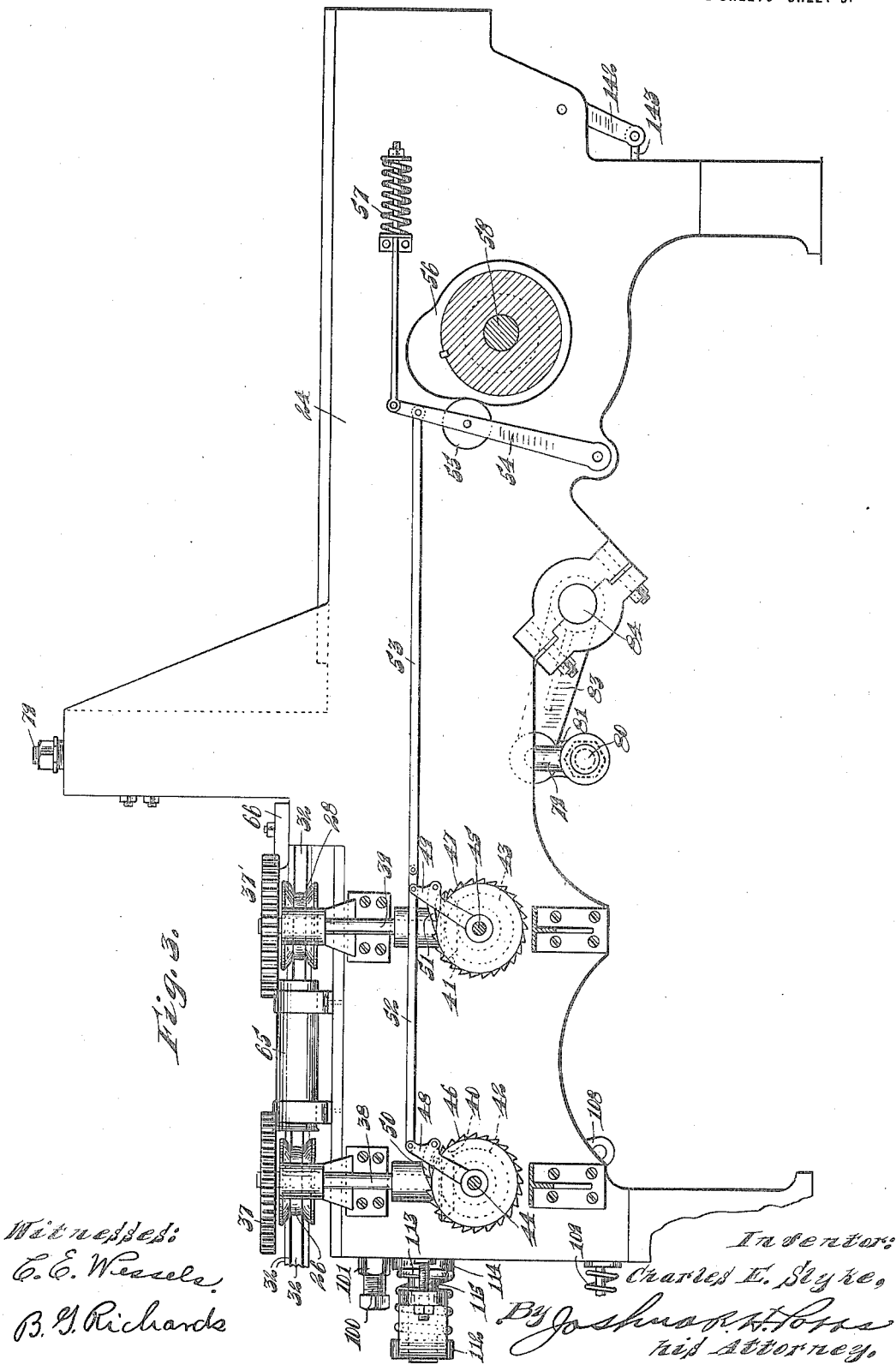

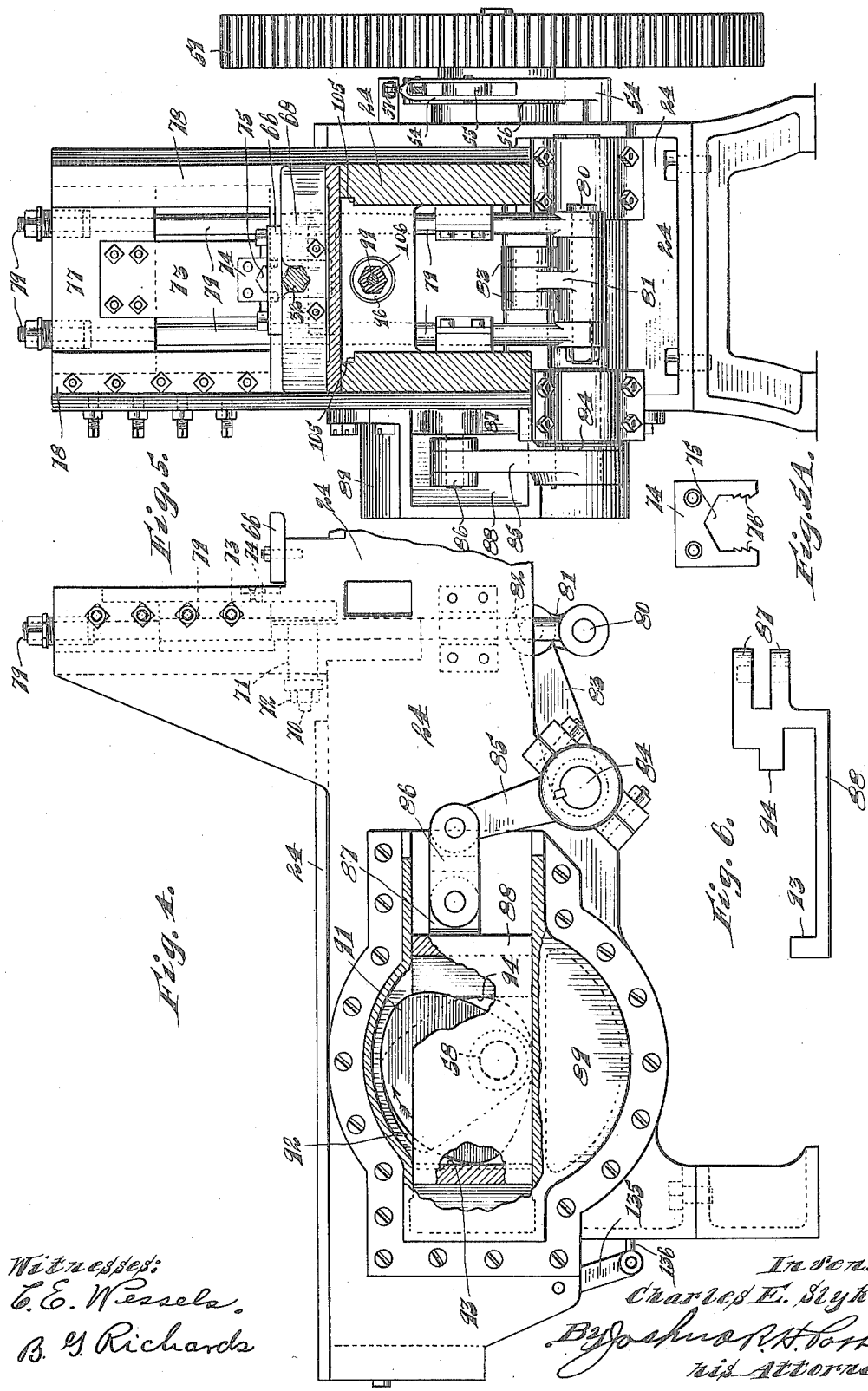

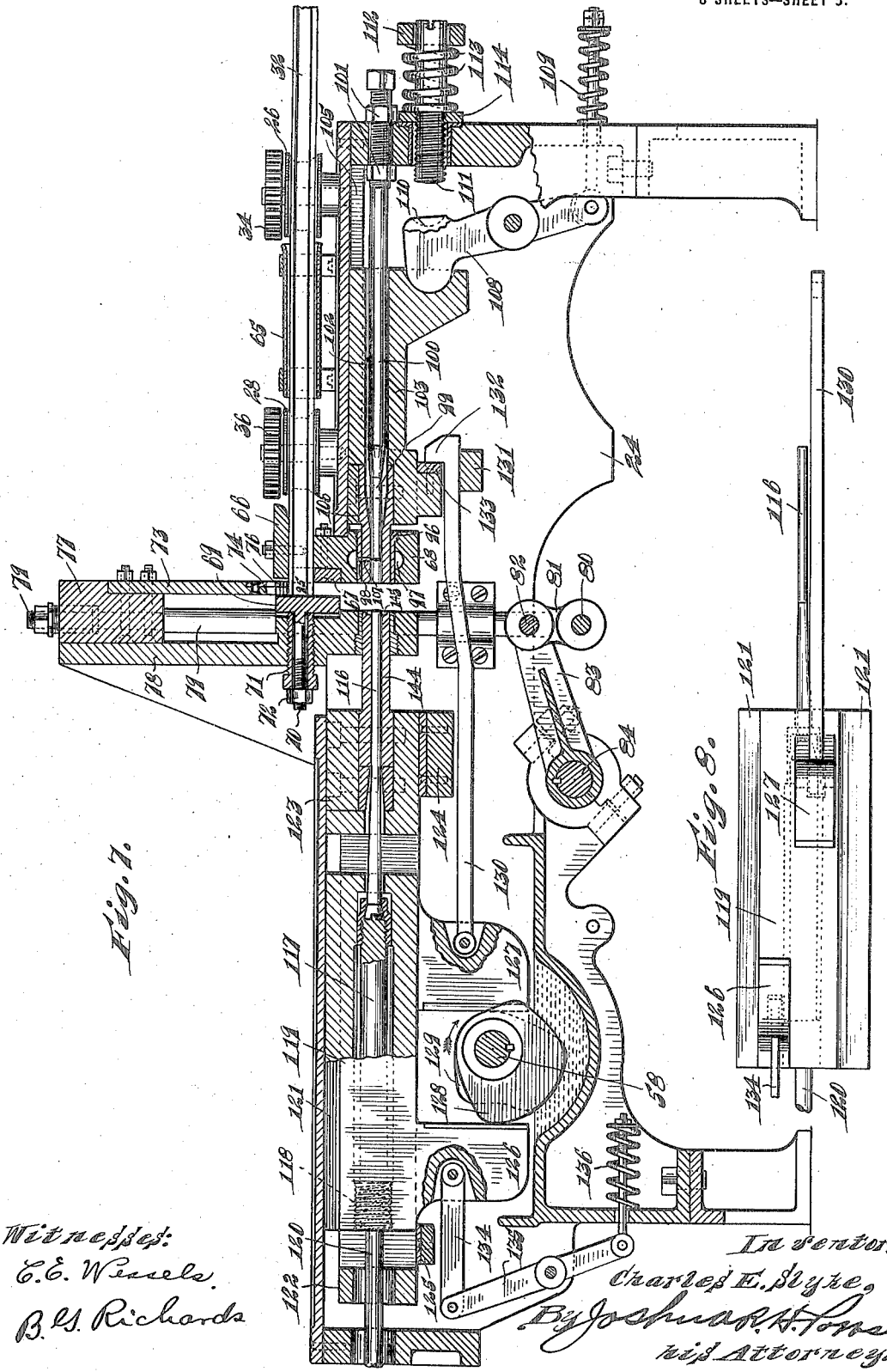

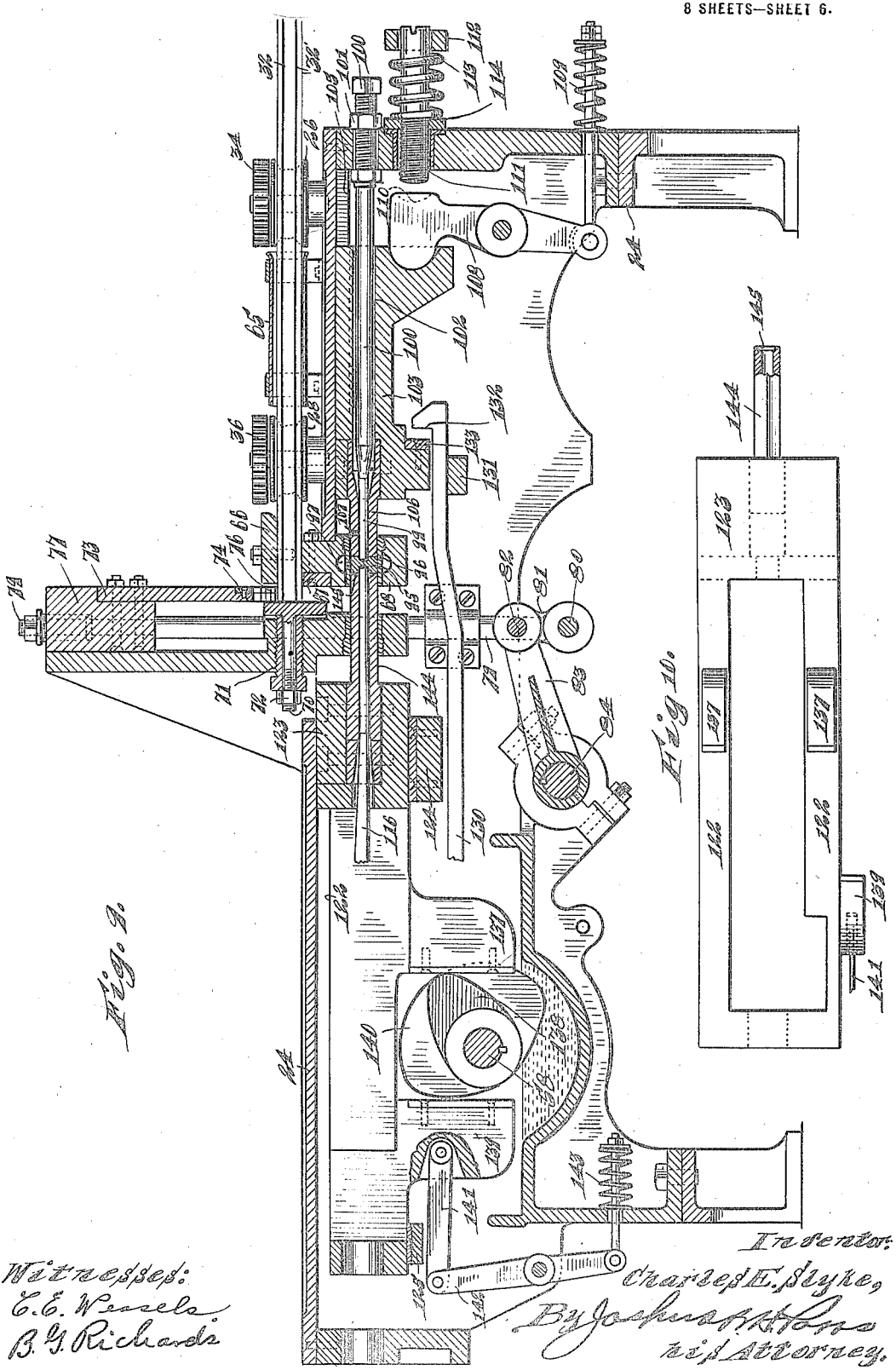

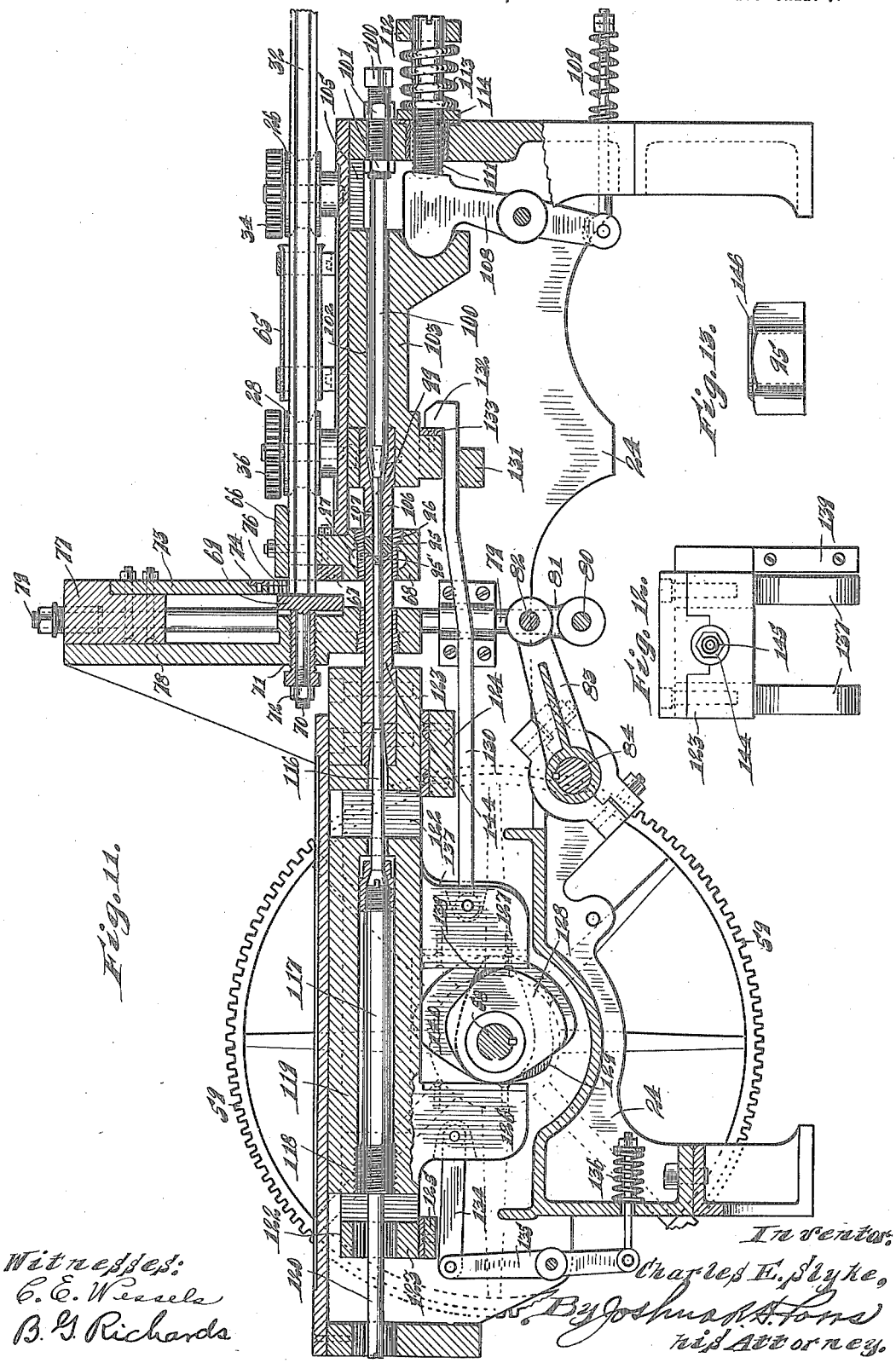

C. E. SLYKE.
NUT MAKING MACHINE.
APPLICATION FILED JUNE 19, 1916.
1,283,933.
Patented Nov. 5, 1918.
8 SHEETS—SHEET 8.
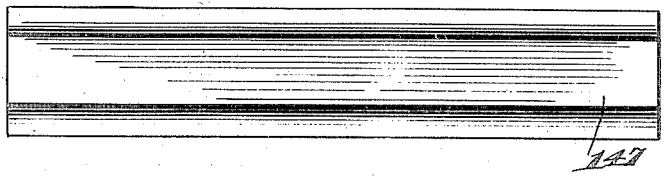
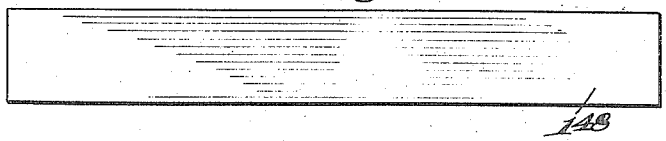
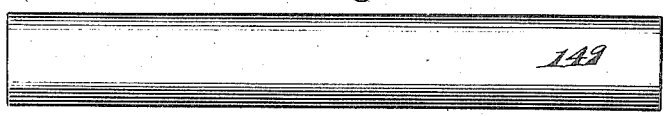
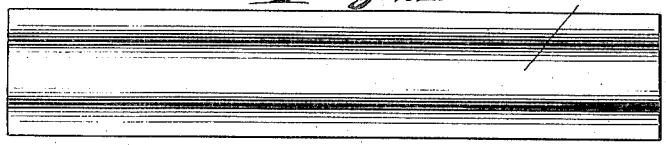
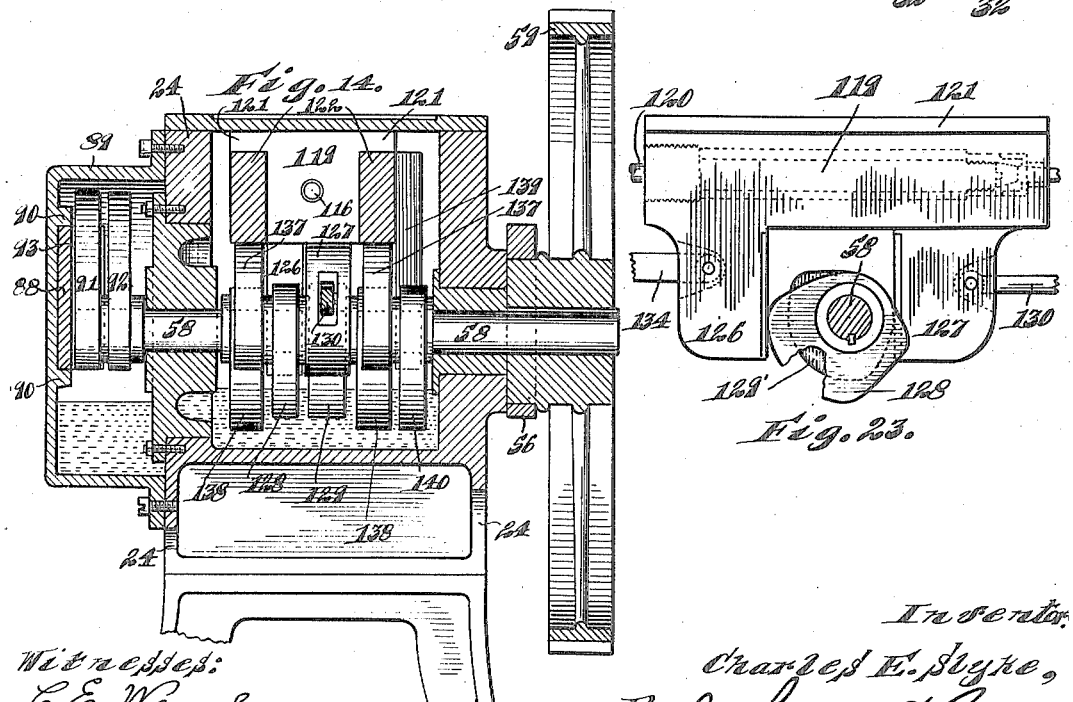

UNITED STATES PATENT OFFICE.

CHARLES E. SLYKE, OF INDIANA HARBOR, INDIANA.

NUT-MAKING MACHINE.

1,283,933.

Specification of Letters Patent.   Patented Nov. 5, 1918.

Application filed June 19, 1916. Serial No. 104,469.

*To all whom it may concern:*

Be it known that I, CHARLES E. SLYKE, a citizen of the United States, and a resident of the city of Indiana Harbor, county of Lake, and State of Indiana, have invented certain new and useful Improvements in Nut-Making Machines, of which the following is a specification.

My invention relates to improvements in nut-making machines, and has for its object the provision of an improved machine of this character adapted to automatically form nuts with great rapidity and with great economy of material.

The invention consists in the combinations and arrangements of parts hereinafter described and claimed.

The invention will be best understood by reference to the accompanying drawings forming a part of this specification, and in which:

Figure 1 is a top plan view, with one corner broken away, of a machine embodying my invention, Fig. 2, an end view of the same, Fig. 3, a side view of the same, Fig. 4, a partial side view, shown partially in section, showing a portion of the side of the machine opposite to that illustrated in Fig. 3, Fig. 5, a transverse section of the machine, Fig. 5ᴬ, a detail view of a shear knife employed in the machine, Fig. 6, a top plan view of a yoke employed in the machine, Fig. 7, a substantially central longitudinal section of the machine, showing the parts in initial or starting position.

Fig. 8, a bottom plan view of a plunger operating carriage employed in the machine, Fig. 9, a longitudinal section of the machine, taken partially on a slightly different plane from that of Fig. 7 and showing the parts in the positions occupied just before completion of a nut therein, Fig. 10, a bottom plan view of a die head operating carriage employed in the machine, Fig. 11, a view similar to Figs. 7 and 9, but taken partially on a slightly different plane from either and showing the positions of the parts at the time of the completion of a nut in the machine, Fig. 12, an end view of the carriage shown in Fig. 10, Fig. 13 is a side view of a nut completed in the machine, Fig. 14, a transverse section of the machine illustrating the cam arrangement on the master shaft thereof, Figs. 15 and 16, side and end views respectively of one form of bar from which nuts may be made, Figs. 17 and 18, a side and end view respectively of another form of rod from which nuts may be made, Figs. 19 and 20, a side and end view respectively of another form of bar, Figs. 21 and 22, a side and end view respectively of another form of bar, and Fig. 23, a detail view showing a slightly modified form of construction of one of the cam members employed on the master shaft of the machine.

The preferred form of construction, as illustrated in Figs. 1 to 22 inclusive, comprises a suitable supporting frame 24 having feed rollers 25, 26, 27 and 28 mounted above one end thereof. The feed rollers 25, 26, 27 and 28 are arranged in coöperating pairs, as indicated, the feed rollers 25 and 27 being each mounted on a swinging arm 29 and yieldingly pressed into coöperating relation with its companion roller by means of a spring 30 whose tension is adjustable by means of a set screw 31, as illustrated in Fig. 1. As best shown in Figs. 2 and 3, the feed rollers 25, 26, 27 and 28 are shaped to receive and feed a bar 32 which is substantially hexagonal in cross section with the sides thereof scalloped or concaved, as shown. The rollers 25, 26, 27 and 28 are driven by means of gears 33, 34, 35 and 36 intermeshing, as shown in Fig. 1. The gears 34 and 36 mesh respectively with gears 37 and 37', mounted respectively at the upper ends of shafts 38 and 39 on the side of frame 24. As best shown in Figs. 1, 2 and 3, shafts 38 and 39 carry respectively at their lower ends bevel gears 40 and 41 meshing with bevel gears 42 and 43 respectively on horizontal shafts 44 and 45. Shafts 44 and 45 are driven respectively by means of ratchet wheels 46 and 47 fixed thereto and coöperating with pawl arms 48 and 49 loose thereon. Pawl arms 48 and 49 carry spring held pawls 50 and 51 coöperating with the corresponding ratchet wheels 46 and 47 and are connected together by means of a connecting rod 52 pivotally connected with the upper end of each. Connecting rod 52 is connected by means of a link 53 with the upper end of an oscillatory lever 54 pivotally mounted on the corresponding side of the frame 24. Lever 54 carries a roller 55 yieldingly held against the periphery of a cam 56 by means of a spring 57. Cam 56 is keyed, or otherwise secured to a shaft 58 which is the master shaft of the machine. Shaft 58 is driven by means of a gear 59 meshing with a pinion 60 on a countershaft 61. Shaft 61 carries a gear 62 meshing with a pinion 63 driven by an ordinary electric motor 64, the arrangement being such as to greatly reduce the speed of said motor. Shaft 61 also carries a hand wheel 61' provided with openings 62' for the insertion of a rod or other tool to facilitate the manual operation of the machine in adjusting the same or making repairs. As best shown in Figs. 1 and 3, a tubular guide 65 is arranged between the feed rollers for the proper guidance of bar 32 and another guide 66 is arranged to position and hold the inner end of said bar against downward tilting. The arrangement is such, as will be readily understood, that at each rotation of master shaft 58, the feed rollers 25, 26, 27 and 28 will be momentarily operated by the action of cam 56 on said master shaft to feed a certain predetermined length or portion of the bar 32 into the machine. The bar 32, before being fed into the machine, is heated to a suitable temperature to render it sufficiently plastic for treatment therein, the particular embodiment of the invention set forth being what is known as a "hot press" nut machine, or a machine which forms the nuts from material rendered plastic by heat.

As best shown in Figs. 1, 4, 5 and 7, a hardened steel knife plate 67 is fitted in a cross bar 68 of the frame of the machine in operative relation with the inner end of the bar 32 after each inward feeding thereof, said knife plate being shaped to partially embrace said bar, as indicated. A gage or stop plate 69 is positioned to abut the inner end of the bar 32 to limit the inward feed thereof and accurately position the same in the machine after each feed thereof. This gage plate is carried by a stem 70 fitting through an adjusting sleeve 71 and arranged to be locked in said sleeve by means of a nut 72 so that the position thereof may be nicely adjusted. A knife carrying plate 73 is provided with a shear knife 74 (shown in detail in Fig. 5^A), said shear knife being provided with a notch 75 adapted to partially embrace the bar 32 and having teeth or serrations 76 in the sides thereof adapted to engage and temporarily hold a severed length of said bar. Knife carrying plate 73 is secured to a cross head 77 reciprocating vertically in suitable guides 78 on the frame of the machine. Cross head 77 is adjustably connected by means of connecting rods 79 with a cross bolt or shaft 80 carried by the lower end of a link 81 connected at its upper end with a crank pin 82 carried by rocker arms 83 keyed to a shaft 84 mounted in the frame of the machine. Shaft 84 carries a rocker arm 85 pivotally connected by means of a link 86 with lugs 87 formed on the end of a yoke 88, as best shown in Figs. 4, 5 and 6.

Yoke 88 is mounted to reciprocate in a suitable housing 89 secured to the corresponding side of the frame 24, said yoke reciprocating in guides 90 in said housing, as best shown in Fig. 14. The master shaft 58 carries two cams 91 and 92 operating in the housing 89 which is preferably provided with an oil well, as indicated, for lubrication of the parts. Cams 91 and 92 contact respectively with cam surfaces 93 and 94 on the yoke 88, as best shown in Figs. 4 and 6, the arrangement being such that at each turn of the master shaft 58, the shear knife 74 is caused to reciprocate past the knife 67 to sever a predetermined length 95 from the bar 32. The pressure necessary to effect the shearing off of the end of the bar 32 will cause the teeth 76 to partially embed themselves in a severed portion and temporarily hold said severed portion in said knife for further treatment by the machine, as will be presently described.

As best shown in Figs. 5 and 7, a tubular die member 96 having a central opening of hexagonal shape, extending therethrough, is mounted in the cross bar 68 of the machine in position to register with the severed bar portion 95 held by the knife 74, at the lower terminal of the movement of the said knife, so as to permit of the transfer of said severed portion to said die. A water channel 97 surrounds the die member 96 which is provided with a passage 98 for the admission of water to the interior thereof for cooling purposes. A stationary piercing plunger or punch 99 is mounted centrally and co-axially with respect to the die member 96 and is carried by a supporting rod 100 adjustably and rigidly secured in the frame of the machine by means of nuts 101. The rod 100 passes loosely through a passage 102 formed in a carriage 103 provided with supporting flanges 104 sliding in guide grooves 105 formed in the frame of the machine. The carriage 103 carries a die head 106 nicely fitting and reciprocating in the die member 96, said die head being provided with a water passage 107 registering with passage 98 for the admission of water for cooling purposes. The die member 106 is yieldingly held in the position indicated in Fig. 7 by means of a rocker arm 108 contacting with the outer portion of carriage 103, said rocker arm being yieldingly held in position by means of an adjustable spring 109, as shown. At its upper rear end, rocker arm 108 is provided with a socket or recess 110 adapted to fit the inner end of a threaded abutment rod 111 which is mounted for reciprocation in the frame of the machine and in a supporting bracket 112 thereon. A strong compression spring 113 is imprisoned between the bracket 112 and a collar 114 threaded on the rod 111 to permit of adjustment of the tension of spring 113. The tension of spring 113, and the position of the end of the abutment 111 may be further adjusted by means of adjusting screws 115, as best shown in Fig. 1. By this arrangement, the die head 106 is arranged to yield under pressure relatively to the plunger or punch 99 to finally come to rest against the abutment 111 which will only yield but slightly against enormous pressure.

A movable piercing plunger or punch member 116 is mounted in the machine in axial alinement with the plunger 99 but on the opposite side of the path of travel of the knife 74, as best shown in Figs. 7, 9, 11 and 12. The plunger 116 is carried by a rod 117 threaded at 118 in a carriage 119, said rod 117 being provided with an adjusting stem 120 for nicely adjusting the same. As best shown in Figs. 7, 8, 10 and 14, the carriage 119 is slidably supported upon supporting flanges 121 riding upon the side bars 122 of another carriage 123 which is mounted to reciprocate in hangers 124 and 125 in the frame of the machine. As best shown in Figs. 7 and 8, the carriage 119 is provided with depending lugs or abutments 126 and 127 contacting with cams 128 and 129 fixed to the master shaft 58 of the machine, the arrangement being such that at each revolution of said master shaft, the carriage 119 will be caused to reciprocate in the machine. Lug 127 is pivotally connected with a hook lever 130 riding upon a support 131 in the frame of the machine and provided with a shoulder 132 arranged to engage a stop 133 on the under side of carriage 103 and by means of which the inward movement of the carriage 103 is effected upon corresponding movement of the carriage 119. The lug 126 is connected by means of a link 134 with the upper end of a rocker lever 135 held to position by means of a spring 136, the arrangement being such as to normally retract the carriage 119 from movement toward the center of the machine.

As best shown in Figs. 9 and 10, the carriage 123 is provided with two corresponding depending lugs or abutments 137 coöperating with a pair of cams 138 fixed to the master shaft 58. The carriage 123 is also provided with another depending abutment 139 contacting with and coöperating with cam 140 fixed to the master shaft 58. Abutment 139 is connected by means of a link 141 with the upper end of a rocker lever 142 yieldingly held to position by means of a spring 143. A die head 144 is mounted on carriage 123 around the plunger 116, said die head having a hexagonal shape to fit the die 96 and being provided at its end with an annular groove 145, as shown, said groove being adapted to form the crown 146 on the head of the nut, as indicated in Fig. 13. The arrangement is such that as the severed portion 95 of the nut is momentarily held by the knife 74 in registration with the die 96, the plunger 116 is first advanced to engage said severed portion, pressing the same slightly within the die 96 and slightly indenting the same to remove the same from the knife upon upward movement thereof. Thereupon the die member 144 is caused to advance until it contacts with said severed portion thus reinforcing the punch 116 against yielding, buckling or breaking under the strain. Then the plunger 116 and the die head 144 are caused to move simultaneously into the die member 96, forcing the die head 106 outwardly against the resistance of spring 109 until the position indicated in Fig. 9 has been reached. This position marks the limit of the inward movement of the plunger 116, in which position the ends of the plungers 99 and 116 have become embedded in the central portions of the nut and the metal of the nut caused to flow or spread outwardly to nicely fill the die 96 and a small plug or portion of metal 95' remaining between the ends of the plungers 99 and 116, as indicated in Fig. 9. The arrangement of the cams is such that thereupon die heads 144 and 106 are forced still farther to the right until the lever 108 is brought to bear against the abutment 111, the central plug 95' is stripped from the body of the nut and the nut fully formed and completed, including the formation of the crown 146 thereon, due to the heavy pressure possible against the abutment 111. Thereupon the parts automatically return to initial position, releasing the completed nut, which falls by gravity from the machine. In order to prevent "drawing" of the temper of the different tools employed, the usual jets of water (not shown) are applied to the parts of the machine to keep the same sufficiently cool to prevent such drawing and the consequent rapid destruction of the tool.

The machine has been illustrated as employing the style of bar illustrated in Figs. 21 and 22, namely a bar of substantially hexagonal cross section but having scalloped or concaved sides forming points or ridges 32' on said bar. The size of the bar is such as to cause the points or ridges 32' to nicely fit the corresponding angles in the die member 96 whereby the nice positioning of the severed portion of the bar in the die is facilitated. With other shapes of bars, the positioning of the severed portions thereof is effected solely by the initial action of the plunger 116, but under proper conditions this will be found to be sufficient. The different forms of bars illustrated in Figs. 15 to 20 may also be used with slight modifications, as will be readily understood. These different forms of bars include a strictly hexagonal bar 147, a square bar 148 and a cylindrical bar or rod 149, as shown.

In the modified form of construction illustrated in Fig. 23, in place of the cam 129 arranged to perform the inward movement of the carriage 119, I substitute a cam 129' of slightly different shape, said cam 129' being arranged to omit the final operation or movement of the die heads 144 and 99, thus omitting the removal of the central plug 95' from the nut. In employing the cam 129', the abutment 111 should be adjusted to contact with and stop the movement of the carriage 103 in the position indicated in Fig. 9, so as to produce the crown 146 on the nut and nicely shape the same. After the discharge of the nut from the machine, the central plug may be removed by other means. The machine thus constituted is capable of manufacturing nuts with great rapidity, but of course is not so desirable as the preferred form of the machine above described inasmuch as it leaves an additional operation to be performed on the nuts.

The nuts may be made in the machine set forth with great rapidity and accuracy, substantially without burs or other imperfections which must be subsequently removed, and with a minimum amount of waste material, the only material wasted being the material removed in the plug 95', and by nicely adjusting the machine, this plug may be made comparatively small.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A machine of the class described comprising a frame; a vertically reciprocating shear knife on said frame; means for feeding a bar to said knife to cut predetermined lengths therefrom; means for temporarily holding the cut-off lengths in said knife; a die positioned under said knife to register with the held lengths; and means for forcing said lengths into said die and compressing them therein, substantially as described.

2. A machine of the class described comprising a frame; a vertically reciprocating shear knife on said frame; means for feeding a bar to said knife to cut predetermined lengths therefrom; means on said knife for temporarily holding the cut-off lengths in said knife; a die positioned under said knife to register with the held lengths; and means for forcing said lengths into said die and compressing them therein, substantially as described.

3. A machine of the class described comprising a frame; a reciprocating shear knife on said frame; means for feeding a bar to said knife to cut predetermined lengths therefrom; means for temporarily holding the cut-off lengths in said knife; a die positioned to register with the held lengths; a stationary piercing plunger arranged centrally in said die; a yielding die head surrounding said plunger in said die; a movable piercing plunger arranged to force said lengths from said knife into said die and coöperating with said stationary plunger to embed their ends therein; a coöperating movable die head surrounding said movable plunger arranged to enter said die and compress said lengths; and means for simultaneously moving said die heads relatively to said plungers, substantially as described.

4. A machine of the class described comprising a frame; a reciprocating shear knife on said frame; means for feeding a bar to said knife to cut predetermined lengths therefrom; means for temporarily holding the cut-off lengths in said knife; a die positioned to register with the held lengths; a stationary piercing plunger arranged centrally in said die; a yielding die head surrounding said plunger in said die; a movable piercing plunger arranged to force said lengths from said knife into said die and coöperating with said stationary plunger to embed their ends therein; a coöperating movable die head surrounding said movable plunger arranged to enter said die and compress said lengths; an abutment arranged to limit the movement of said yielding die head; and means for simultaneously moving said die heads relatively to said plungers to effect contact between said yielding die head and said abutment, substantially as described.

5. A downwardly operating knife for machines of the class described shaped to partially embrace a rod being cut thereby; horizontal teeth in the embracing sides of said knife arranged to temporarily hold a length cut off thereby but permit of lateral removal thereof; and a plunger arranged to contact with a side of said length and force it from said knife, substantially as described.

6. A machine of the class described comprising a frame; a reciprocating shear knife on said frame, said knife being shaped to partially embrace a rod being cut thereby; teeth in the sides of said knife arranged to temporarily hold a length cut off thereby; means for feeding a bar to said knife to cut predetermined lengths therefrom; a die positioned to register with the held lengths; means for forcing said lengths into said die; and means for compressing the central portions of said lengths to cause spreading thereof to fill the die and form portions of an opening therethrough, substantially as described.

7. A machine of the class described comprising a frame; a reciprocating shear knife on said frame, said knife being shaped to partially embrace a rod being cut thereby; teeth in the sides of said knife arranged to temporarily hold a length cut off thereby; means for feeding a bar to said knife to cut predetermined lengths therefrom; a die positioned to register with the held lengths; a stationary piercing plunger arranged centrally in said die; a yielding die head surrounding said plunger in said die; a movable piercing plunger arranged to force said lengths from said knife into said die and coöperating with said stationary plunger to embed their ends therein; a coöperating movable die head surrounding said movable plunger arranged to enter said die and compress said lengths; an abutment arranged to limit the movement of said yielding die head; and means for simultaneously moving said die heads relatively to said plungers to effect contact between said yielding die head and said abutment, substantially as described.

8. A machine of the class described comprising a frame; a die; a stationary piercing plunger arranged centrally in said die; a yielding die head surrounding said plunger in said die; a movable piercing plunger arranged to force blanks into said die and coöperate with said stationary plunger to embed their ends therein; a coöperating movable die head surrounding said movable plunger arranged to enter said die and compress blanks therein; means for simultaneously moving said die heads relatively to said plungers; and means for presenting nut blanks to said die, substantially as described.

9. A machine of the class described comprising a frame; a die; a stationary piercing plunger arranged centrally in said die; a yielding die head surrounding said plunger in said die; a movable piercing plunger arranged to force nut blanks into said die and coöperate with said stationary plunger to embed their ends therein; a coöperating movable die head surrounding said movable plunger, arranged to enter said die and compress blanks therein; a yieldable abutment arranged to limit the movement of said yielding die head; and means for simultaneously moving said die heads relatively to said plungers to effect contact between said yielding die head and said abutment; and means for presenting nut blanks to said die, substantially as described.

In testimony whereof I have signed my name to this specification in the presence of two subscribing witnesses.

CHARLES E. SLYKE.

Witnesses:
JOSHUA R. H. POTTS,
B. G. RICHARDS.